UNITED STATES PATENT OFFICE.

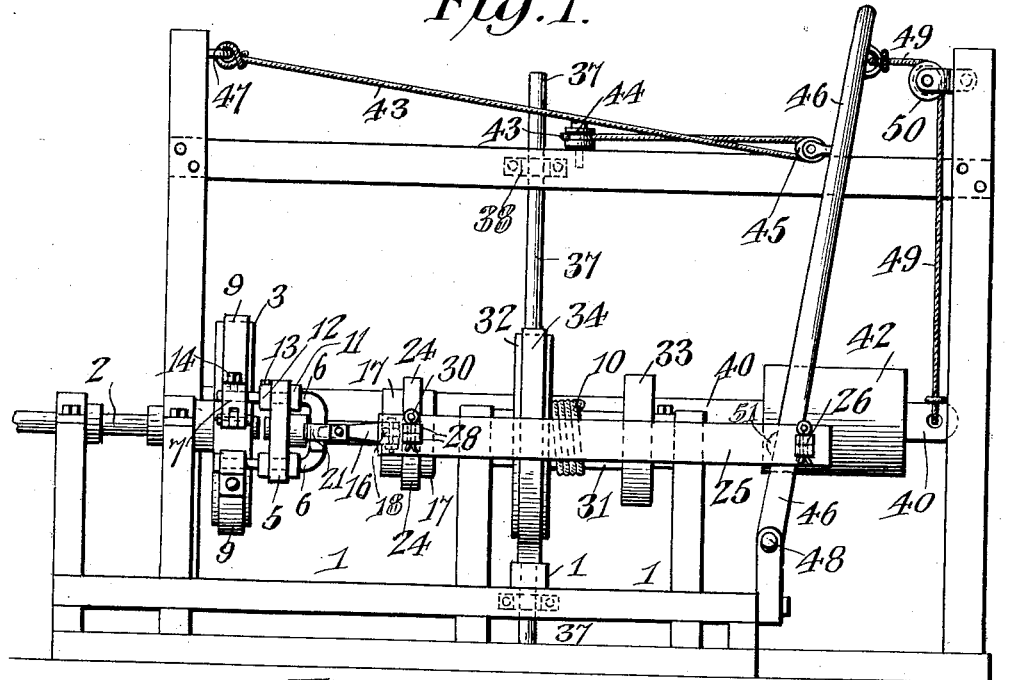
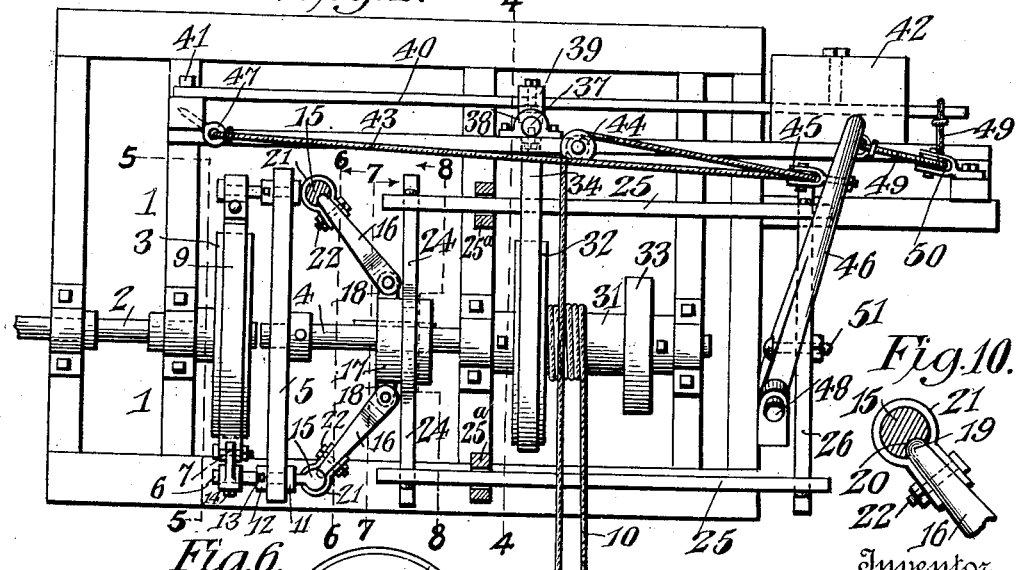
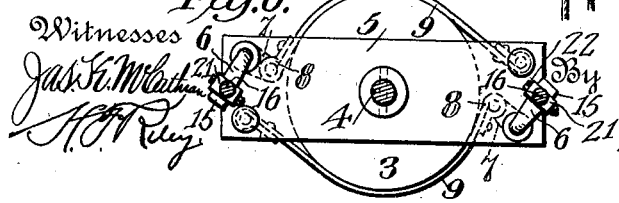

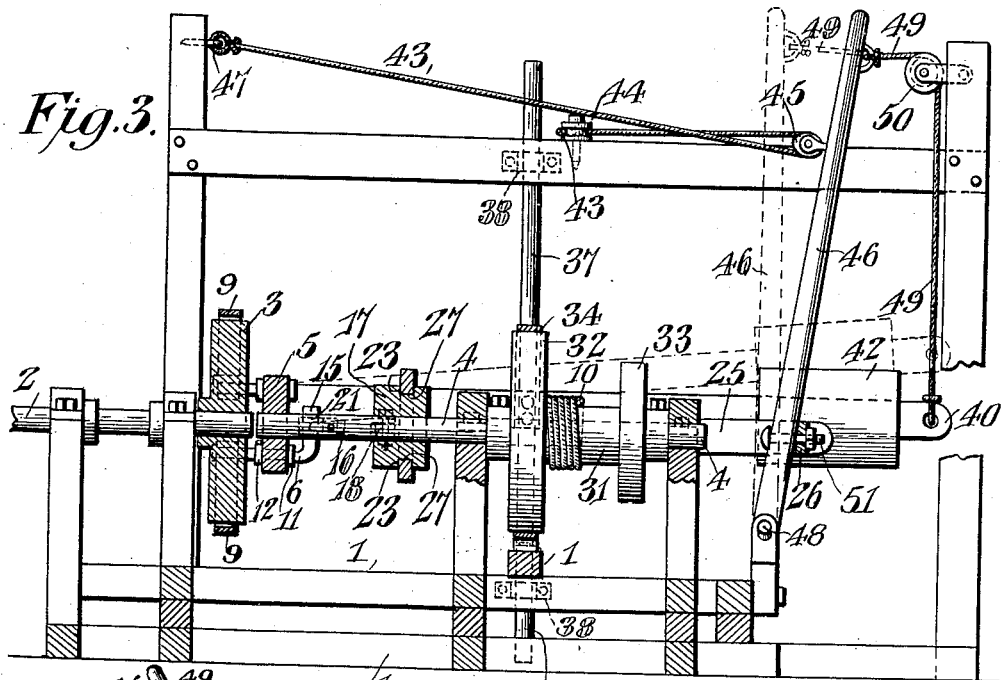

DAVID B. WHITEHILL, OF NORTH CLARENDON, PENNSYLVANIA.

CLUTCH-ACTUATING DEVICE.

1,062,625.  Specification of Letters Patent.  Patented May 27, 1913.

Application filed June 16, 1910. Serial No. 567,250.

*To all whom it may concern:*

Be it known that I, DAVID B. WHITEHILL, a citizen of the United States, residing at North Clarendon, in the county of Warren and State of Pennsylvania, have invented a new and useful Clutch-Actuating Device, of which the following is a specification.

The invention relates to a clutch actuating device for well bailing operating mechanism.

The object of the present invention is to improve the construction of clutch actuating devices, and to provide a simple, efficient and inexpensive device of this character designed for use in connection with well bailing operating mechanism, and capable of enabling a wire rope or line to be employed in such mechanism.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of the well bailing operating mechanism, constructed in accordance with this invention. Fig. 2 is a plan view of the same. Fig. 3 is a longitudinal sectional view. Fig. 4 is a sectional view on the line 4—4 of Fig. 2. Fig. 5 is a similar view on the line 5—5 of Fig. 2. Fig. 6 is a transverse sectional view on the line 6—6 of Fig. 2. Fig. 7 is a detail sectional view on the line 7—7 of Fig. 2. Fig. 8 is a similar view on the line 8—8 of Fig. 2. Fig. 9 is a detail perspective view, illustrating the construction for actuating the bands of the clutch for coupling the drum shaft to the driving shaft. Fig. 10 is an enlarged detail sectional view, illustrating the construction of the connection between the links and the rock shafts.

Like numerals of reference designate corresponding parts in all the figures of the drawings.

In the embodiment of the invention illustrated in the accompanying drawings, 1 designates a frame, which may be of any preferred construction. At one end thereof is located a driving shaft 2, continuously operated from any suitable source of power and carrying a driving wheel 3, constituting an element of the friction band clutch for coupling a drum shaft 4 to the driving shaft 2. The frame 1 is provided with suitable bearings for the driving shaft and the drum shaft, and the latter, which is disposed in line with the driving shaft, is equipped with a cross head 5, fixed to the drum shaft adjacent to the driving or clutch wheel 3 and forming a support for a pair of reversely disposed rock shafts 6, journaled in suitable bearings at the ends of the cross head 5 and provided at their outer ends with arms 7, extending in opposite directions and connected with the free ends 8 of the clutch bands 9. The clutch bands 9, which are arranged to engage the periphery of the clutch wheel 3 at opposite sides thereof, have their other ends suitably fixed to the end portions of the cross head 5, as clearly shown in Fig. 6 of the drawings. When the rock shafts 6 are rotated in one direction the bands 9 are caused to frictionally engage the periphery of the clutch wheel 3 for connecting the drum shaft with the driving shaft, and a movement of the rock shafts in the opposite direction loosens the bands and disconnects the drum shaft from the driving shaft. With the construction shown, a relatively small amount of movement of the rock shafts 6 will engage the bands with and disengage the bands from the clutch wheel, and the gripping action of the band is such that a wire bail cable or line 10 may be employed in well bailing operations, whereas the clutch mechanism of the aforesaid patent is designed and adapted for use only in connection with Manila bail cables. This quick engagement and release of the clutch wheel also enables the brake hereinafter described to be operated independently of the clutch to stop and release the drum without setting the clutch. The rock shafts 6 are preferably equipped with collars 11 and 12, located at the opposite faces of the cross heads and adapted to hold the rock shafts against longitudinal movement in the bearing openings of the cross head. The collar 11 is fixed while the collar 12 is adjustably secured to the rock shafts by means of a clamping screw 13. The arms 7 are also adjustably secured to the rock shafts 6 at one end thereof by clamping screws 14, and are adapted to have their positions changed to correct any wear of the clutch wheel 3, and to produce the desired gripping action of the bands 9 on the same.

The rock shafts are provided at their inner ends with arms 15, extending in opposite directions and connected by links 16 with a hub or sleeve 17, mounted on the drum shaft and provided with opposite lugs 18 to which the inner ends of the links 16 are pivoted. The links diverge outwardly from the slidable sleeve or member 17 to the operating arms 15 of the rock shafts. The outer ends 19 are rounded and fit in recesses or sockets 20 of the inner operating arms 15 of the rock shafts 6, and the said outer terminals of the links 16 are maintained in the sockets 20 by yokes 21, consisting preferably of metallic straps or bands passed around the arms 15 and having their terminals fitted against the opposite sides of the links 16 and pivoted to the same by transverse bolts 22, or other suitable fastening devices. This construction provides a simple and efficient universal joint, which affords all the necessary movement and play of the parts to insure a proper operation of the clutch band actuating rock shafts.

The slidable sleeve or member is provided with an annular groove 23 and is engaged by a transverse end member 24 of a slidable frame, approximately rectangular and composed of side bars 25, arranged horizontally and slidable in openings of suitable guides 25ª of the frame, and connected at one end of the frame by the end member 24 and at the other end by a transverse bar 26. The end member 24 is preferably composed of two sections, enlarged at the center and provided with semi-circular recesses 27 forming a central opening for the head or member 17. The terminals 28 of the sections of the end member 24 are reduced and secured in opposite openings 29 of the side bars 25 of the frame by suitable fastening devices 30, consisting of keys or pins, or the like.

The wire bail operating cable 10 is wound on and unwound from a drum 31, equipped with heads 32 and 33, which are in the form of brake wheels. The brake wheel 32 receives a band 34, secured at one end to the frame 1, as shown at 35, and connected at its other end, as shown at 36, to an actuating rod or member 37, mounted for vertical reciprocation in suitable guides or bearings 38, and connected by a link 39 with a horizontally disposed lever 40, fulcrumed at one end to the frame by a suitable pivot 41 and equipped at its free end with a weight 42, which tends to depress the actuating rod or member 37 and thereby hold the band brake set. The band brake is adapted to be released by an operator's cord or cable 43, extending from the well to the operating mechanism, the cord or cable 43 being passed through guide pulleys 44 and 45, mounted on the frame 1 and on a lever 46, respectively. One end of the operator's cord or cable is fastened at 47 to the frame, and in practice suitable means is provided at the well for holding the free end of the cord or cable 43. The lever 46 is fulcrumed at its lower end 48 on the frame, and its upper end is connected by a flexible element 49 with the horizontal weight carrying lever 40, the said flexible element 49 being guided by a pulley 50, located at the outer side and beyond the lever 46 and also at a point above the weight carrying lever, which normally maintains the lever 46 inclined upwardly and outwardly. It will thus be seen that by pulling the operator's cord or cable in a direction away from the machine, the lever will be tilted inwardly and the weight carrying lever will be raised and the band brake released from the brake wheel 32. This is effected by the movement of the lever 46 from the inclined position shown in full lines in Fig. 3 of the drawings to the dotted vertical position illustrated in the said figure. A further pull on the operator's cord or cable will cause the lever 46 to continue its movement in the same direction and actuate the slidable frame, which is connected with the clutch mechanism. The end bar 26 of the slidable frame is connected by a bolt 51 with the lever 46, and the said movement of the latter inwardly beyond a perpendicular position carries the opposite bands 9 into engagement with the clutch wheel 3. It will thus be apparent that a single operating mechanism is adapted to set and release the brake without setting the clutch, and may also be manipulated to operate the clutch to couple the drum shaft to the driving shaft and to uncouple it therefrom.

The brake wheel 33 is designed to constitute an element of the slack controlling device, forming the subject-matter of an application, filed Oct. 25, 1909, Serial No. 524,491. Being thus equipped with the automatic slack controlling device, the well bailing operating mechanism may be controlled and operated at a distance from it, at the various wells in the location at which the mechanism is installed, and kinking and consequent breaking of the wire bail operating cable will be prevented.

Having thus fully described my invention, what I claim as new and desire to secure by Letters Patent, is:—

1. In mechanism of the class described, the combination of a driving shaft, a drum shaft, a lever located at the outer end of the drum shaft, a clutch wheel mounted on the driving shaft, clutch mechanism for engaging the clutch wheel including a sleeve slidable on the drum shaft, a slidable frame composed of side bars located at opposite sides of the drum shaft, an inner end bar connecting the side bars with the sleeve, and an outer end bar connecting the side bars with the lever, and supporting means for the slidable frame.

2. In mechanism of the class described, the combination of a driving shaft, a drum shaft, a lever located at the outer end of the drum shaft, a clutch wheel mounted on the driving shaft, clutch mechanism for engaging the clutch wheel including a sleeve slidable on the drum shaft, spaced guides located at opposite sides of the drum shaft, and a slidable frame composed of side bars also located at opposite sides of the drum shaft and slidable in the guides, an inner end bar connecting the side bars with the sleeve, and an outer end bar connecting the side bars with the lever.

In testimony, that I claim the foregoing as my own, I have hereto affixed my signature in the presence of two witnesses.

DAVID B. WHITEHILL.

Witnesses:
JOHN H. SIGGERS,
DAVID R. WAGNER.

Copies of this patent may be obtained for five cents each, by addressing the "Commissioner of Patents, Washington, D. C."